US012572220B2

(12) United States Patent
Zhao et al.

(10) Patent No.: US 12,572,220 B2
(45) Date of Patent: Mar. 10, 2026

(54) SYSTEMS AND METHODS FOR MULTI-MODAL INTERACTION ANALYSIS

(71) Applicant: Samsung Electronics Co., Ltd., Suwon-si (KR)

(72) Inventors: Dongfang Zhao, San Diego, CA (US); Sobhan Soleymani, San Diego, CA (US); Razieh Kaviani Baghbaderani, San Jose, CA (US); Yangwen Liang, San Diego, CA (US); Shuangquan Wang, San Diego, CA (US); Kee-Bong Song, San Diego, CA (US); Yanlin Zhou, San Diego, CA (US); Mostafa El-Khamy, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/899,741

(22) Filed: Sep. 27, 2024

(65) Prior Publication Data

US 2025/0328198 A1 Oct. 23, 2025

Related U.S. Application Data

(60) Provisional application No. 63/636,601, filed on Apr. 19, 2024.

(51) Int. Cl.
*G06F 3/01* (2006.01)
*G06V 10/32* (2022.01)
*G06V 10/82* (2022.01)
*G06V 20/64* (2022.01)
(Continued)

(52) U.S. Cl.
CPC .............. *G06F 3/017* (2013.01); *G06V 10/32* (2022.01); *G06V 10/82* (2022.01); *G06V 20/64* (2022.01); *G06V 40/28* (2022.01); *G06V 10/12* (2022.01)

(58) Field of Classification Search
CPC ........ G06F 3/017; G06V 10/32; G06V 10/82; G06V 20/64; G06V 40/28; G06V 10/12
See application file for complete search history.

(56) References Cited

U.S. PATENT DOCUMENTS

| | | | |
|---|---|---|---|
| 10,796,482 B2 | 10/2020 | Ge et al. | |
| 10,891,473 B2 | 1/2021 | Zhang et al. | |
| 11,551,374 B2 | 1/2023 | Li et al. | |

(Continued)

OTHER PUBLICATIONS

Zhang, Fan, et al. Google Research. Mediapipe hands: On-device real-time hand tracking. arXiv preprint arXiv:2006.10214 (2020).

(Continued)

*Primary Examiner* — Premal R Patel
(74) *Attorney, Agent, or Firm* — Womble Bond Dickinson (US) LLP

(57) ABSTRACT

A method and device are disclosed for interaction analysis. The method includes receiving, by an interaction-analysis circuit of a device, input image data from an interaction sensor, generating, by the interaction-analysis circuit, a cropped-and-resized image based on detecting a three-dimensional (3D) object in the input image data, generating, by the interaction-analysis circuit, a 3D pose-estimation structure based on the cropped-and-resized image, determining, by the interaction-analysis circuit, a gesture classification based on the 3D pose-estimation structure, and transmitting the gesture classification.

20 Claims, 4 Drawing Sheets

(51) Int. Cl.
  _G06V 40/20_  (2022.01)
  _G06V 10/12_  (2022.01)

(56) References Cited

U.S. PATENT DOCUMENTS

| | | | | |
|---|---|---|---|---|
| 11,841,920 | B1 | 12/2023 | Marsden et al. | |
| 11,854,308 | B1 | 12/2023 | Marsden et al. | |
| 2011/0107216 | A1* | 5/2011 | Bi ......................... | G06F 3/0481 |
| | | | | 715/863 |
| 2011/0291926 | A1* | 12/2011 | Gokturk ............... | G06V 40/113 |
| | | | | 345/158 |
| 2018/0052520 | A1* | 2/2018 | Amores Llopis ..... | G06F 3/0304 |
| 2021/0180942 | A1* | 6/2021 | Lin ......................... | G06N 3/047 |
| 2022/0291752 | A1* | 9/2022 | Agu ........................ | A63F 13/26 |
| 2022/0343687 | A1 | 10/2022 | Zhou et al. | |
| 2023/0044664 | A1 | 2/2023 | Sinha et al. | |
| 2023/0206613 | A1* | 6/2023 | Mahbub ............... | G06V 10/454 |
| | | | | 382/103 |
| 2023/0252737 | A1* | 8/2023 | Dreyer ................... | G06F 3/017 |
| | | | | 345/633 |
| 2024/0126381 | A1* | 4/2024 | Korrapati .................. | G06T 7/70 |

OTHER PUBLICATIONS

Gao, Qing, et al. "Dynamic hand gesture recognition based on 3D hand pose estimation for human-robot interaction." IEEE Sensors Journal 22.18 (2021): 17421-17430.

Sharma, Ashish, et al. "Hand gesture recognition using image processing and feature extraction techniques." Procedia Computer Science 173 (2020): 181-190.

* cited by examiner

Figure 3:
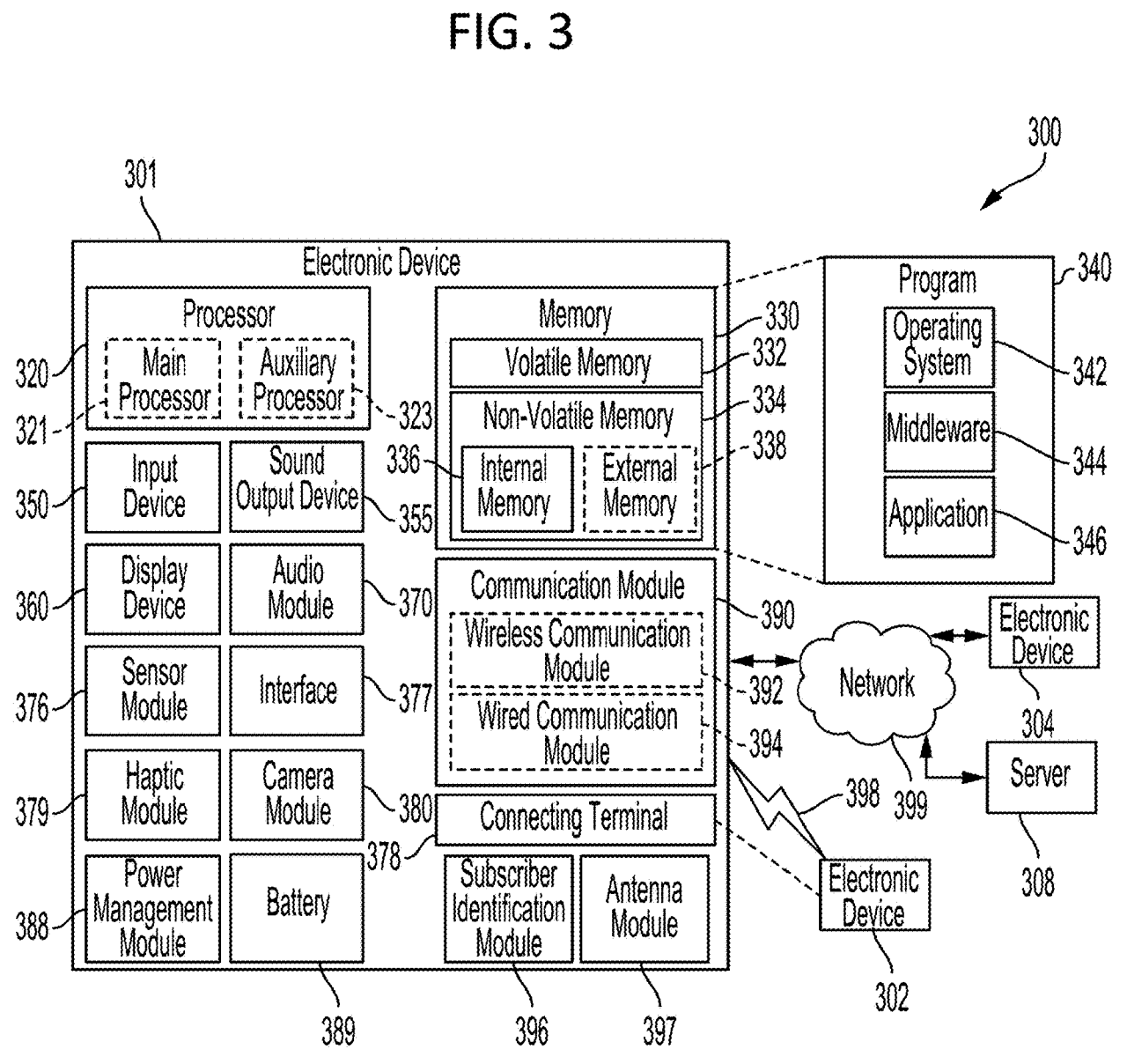

Program — 340
- Operating System — 342
- Middleware — 344
- Application — 346

Electronic Device — 304
Server — 308

Network — 398  399

Electronic Device — 302

Electronic Device — 301

Processor — 320
- Main Processor — 321
- Auxiliary Processor — 323

Memory — 330
- Volatile Memory — 332
- Non-Volatile Memory — 334
  - Internal Memory — 336
  - External Memory — 338

Communication Module — 390
- Wireless Communication Module — 392
- Wired Communication Module — 394

Connecting Terminal — 378

Subscriber Identification Module — 396

Antenna Module — 397

Sound Output Device — 355

Audio Module — 370

Interface — 377

Camera Module — 380

Input Device — 350

Display Device — 360

Sensor Module — 376

Haptic Module — 379

Power Management Module — 388

Battery — 389

400

401 — Receive input image data from an interaction sensor

402 — Generate a cropped-and-resized image based on detecting a 3D object in the input image data 403 — Generate a 3D pose-estimation structure based on the cropped-and-resized image 404 — Determine a gesture classification based on the 3D pose-estimation structure 405 — Transmit the gesture classification

SYSTEMS AND METHODS FOR MULTI-MODAL INTERACTION ANALYSIS

CROSS-REFERENCE TO RELATED APPLICATION

This application claims the priority benefit under 35 U.S.C. § 119 (e) of U.S. Provisional Application No. 63/636, 601, filed on Apr. 19, 2024, the disclosure of which is incorporated by reference in its entirety as if fully set forth herein.

TECHNICAL FIELD

The disclosure generally relates to machine learning. More particularly, the subject matter disclosed herein relates to improvements to interaction analysis by a device using machine learning.

SUMMARY

Devices (e.g., virtual reality (VR) devices, augmented reality (AR) devices, communications devices, medical devices, appliances, machines, etc.) may make determinations about interactions with the devices. For example, a VR or AR device may detect human-device interactions (also referred to as human-computer interactions), such as specific hand gestures (or hand poses). The device may use information associated with the interactions to perform an operation on the device (e.g., changing a setting on the device). Similarly, any device may be configured to estimate different interactions with the device and perform operations associated with the estimated interactions.

Real-time analysis of human-computer interactions (e.g., human hand movements and gestures) is a fundamental challenge in fields such as computer vision. Some systems are limited in accurately detecting interactions. For example, some systems may struggle with issues like detecting interactions in the presence of occlusions, varying lighting conditions, etc. Some systems may use specialized hardware. Aspects of some embodiments of the present disclosure allow for systems that operate effectively in various real-world scenarios, including occlusion scenarios and rapid-hand-movement scenarios, making such systems versatile and adaptable.

Some systems may provide 2.5D pose estimation based on a single input image, which may provide x-coordinates, y-coordinates, and relative depths of hand joints, instead of true depths of the hand joints. Such systems may fail to predict the true locations of hand joints. Some systems may not provide accurate gesture information. Some systems may provide gesture information without providing hand joint locations. Hand joint locations may be suitable for hand rendering in VR and AR devices. As used herein, "hand rendering" refers to how a hand is depicted in a virtual environment.

Aspects of some embodiments of the present disclosure leverage high quality input image data from which true depth information may be generated. In some embodiments, stereo imaging may be used to provide robust (e.g., improved) detection (e.g., hand detection), pose estimation (e.g., hand-pose estimation), and gesture recognition (e.g., hand-gesture recognition) in real-time. Improved real-time interaction analysis may allow for greater versatility and reliability in human-computer interaction systems. Synchronized stereo imaging may be used to enhance the accuracy of interaction analysis, particularly in 3D pose estimation, which allows for more precise and natural interactions.

In some embodiments, a depth-sensing camera may be used to provide input image data instead of, or in addition to, a stereo camera. In some embodiments, a light detection and ranging (LiDAR) sensor may be used instead of, or in addition to, a stereo camera. The depth-sensing camera and/or the LiDAR sensor may provide depth data directly to the system, such that camera calibration may be avoided (e.g., bypassed) and depth perception may be enhanced.

In some embodiments, a system for interaction analysis includes a detection module, an estimation module, and a gesture-recognition module in one single device.

In some embodiments, a system may provide real-time feedback to users enabling faster responses (e.g., immediate responses) to gestures for more natural and dynamic interactions with digital environments.

In some embodiments, because detection, estimation, and gesture recognition are integrated in one system, users may define and train custom hand gestures, tailoring the system to specific application requirements.

In some embodiments, the system may recognize both static gestures and dynamic gestures, allowing for a wide range of interactive possibilities.

Aspects of some embodiments of the present disclosure provide a unified solution for detection, pose estimation, and gesture recognition, simplifying the development and deployment of human-computer interaction systems.

Aspects of some embodiments of the present disclosure provide for a comprehensive approach to interaction analysis by incorporating detection, estimation, and gesture recognition, for real-time analysis, improved spatial-temporal characteristics, and adaptability. For example, real-time analysis may be provided based on the system's relatively simple structure having little delay from image capture to 3D hand-pose display and gesture recognition. Improved spatial-temporal characteristics may be achieved based on accurate and timely hand joint information being available for processing by the system, in part, due to using stereo image information. Adaptability may be provided based on the simplicity of the three-module structure of the system.

According to some embodiments of the present disclosure, a method for interaction analysis includes receiving, by an interaction-analysis circuit of a device, input image data from an interaction sensor, generating, by the interaction-analysis circuit, a cropped-and-resized image based on detecting a three-dimensional (3D) object in the input image data, generating, by the interaction-analysis circuit, a 3D pose-estimation structure based on the cropped-and-resized image, determining, by the interaction-analysis circuit, a gesture classification based on the 3D pose-estimation structure, and transmitting the gesture classification.

The method may further include generating the 3D pose-estimation structure based on an interaction-sensor parameter associated with determining depth information associated with the cropped-and-resized image.

The interaction sensor may include a stereo camera, and the input image data may include a first image associated with a left sensor and a second image associated with a right sensor.

The interaction sensor may include a depth sensing camera, and the input image data may include depth image data.

The interaction sensor may include a light detection and ranging (LiDAR) sensor, and the input image data includes cloud point data.

The method may further include generating, by a first machine-learning model, a bounding-box image and a confidence level, based on the input image data, wherein the detecting the 3D object is performed by the first machine-learning model.

The first machine-learning model may include a convolutional neural network (CNN).

The method may further include cropping and resizing the bounding-box image to generate the cropped-and-resized image, and inputting the cropped-and-resized image to a second machine-learning model, wherein the generating the 3D pose-estimation structure is performed, by the second machine-learning model, based on the cropped-and-resized image.

The method may further include outputting, by a third machine-learning model, a classification of a gesture, wherein the determining the gesture is performed by the third machine-learning model and based on a plurality of outputs from the second machine-learning model.

According to other embodiments of the present disclosure, a device includes a memory, and a processor communicatively coupled to the memory, wherein the processor is configured to receive input image data from an interaction sensor, generate a cropped-and-resized image based on detecting a three-dimensional (3D) object in the input image data, generate a 3D pose-estimation structure based on the cropped-and-resized image, determine a gesture classification based on the 3D pose-estimation structure, and transmitting the gesture classification.

The processor may be configured to generate the 3D pose-estimation structure based on an interaction-sensor parameter associated with determining depth information associated with the cropped-and-resized image.

The processor may be configured to detect the 3D object based on a first machine-learning model, and generate a bounding-box image and a confidence level, based on providing the input image data to the first machine-learning model.

The processor may be configured to crop and resize a bounding-box image to generate the cropped-and-resized image, and generate the 3D pose-estimation structure based on providing the cropped-and-resized image to a second machine-learning model.

The processor may be configured to determine the gesture classification based on providing the 3D pose-estimation structure to a third machine-learning model, and output the gesture classification from the third machine-learning model.

The processor may be configured to determine the gesture classification based on a plurality of outputs from the second machine-learning model.

According to other embodiments of the present disclosure, a system includes a memory, and a means for processing configured to receive input image data from an interaction sensor, generate a cropped-and-resized image based on detecting a three-dimensional (3D) object in the input image data, generate a 3D pose-estimation structure based on the cropped-and-resized image, determine a gesture classification based on the 3D pose-estimation structure, and transmitting the gesture classification.

The means for processing may be configured to generate the 3D pose-estimation structure based on an interaction-sensor parameter associated with determining depth information associated with the cropped-and-resized image.

The means for processing may be configured to detect the 3D object based on a first machine-learning model, and generate a bounding-box image and a confidence level, based on providing the input image data to the first machine-learning model.

The means for processing may be configured to crop and resize a bounding-box image to generate the cropped-and-resized image, and generate the 3D pose-estimation structure based on providing the cropped-and-resized image to a second machine-learning model.

The means for processing may be configured to determine the gesture classification based on providing the 3D pose-estimation structure to a third machine-learning model, and output the gesture classification from the third machine-learning model.

BRIEF DESCRIPTION OF THE DRAWING

In the following section, the aspects of the subject matter disclosed herein will be described with reference to exemplary embodiments illustrated in the figures.

FIG. 1 is a block diagram depicting a system for multi-modal interaction analysis, according to some embodiments of the present disclosure.

FIG. 3 is a block diagram of an electronic device in a network environment, according to some embodiments of the present disclosure.

DETAILED DESCRIPTION

Figure 2:
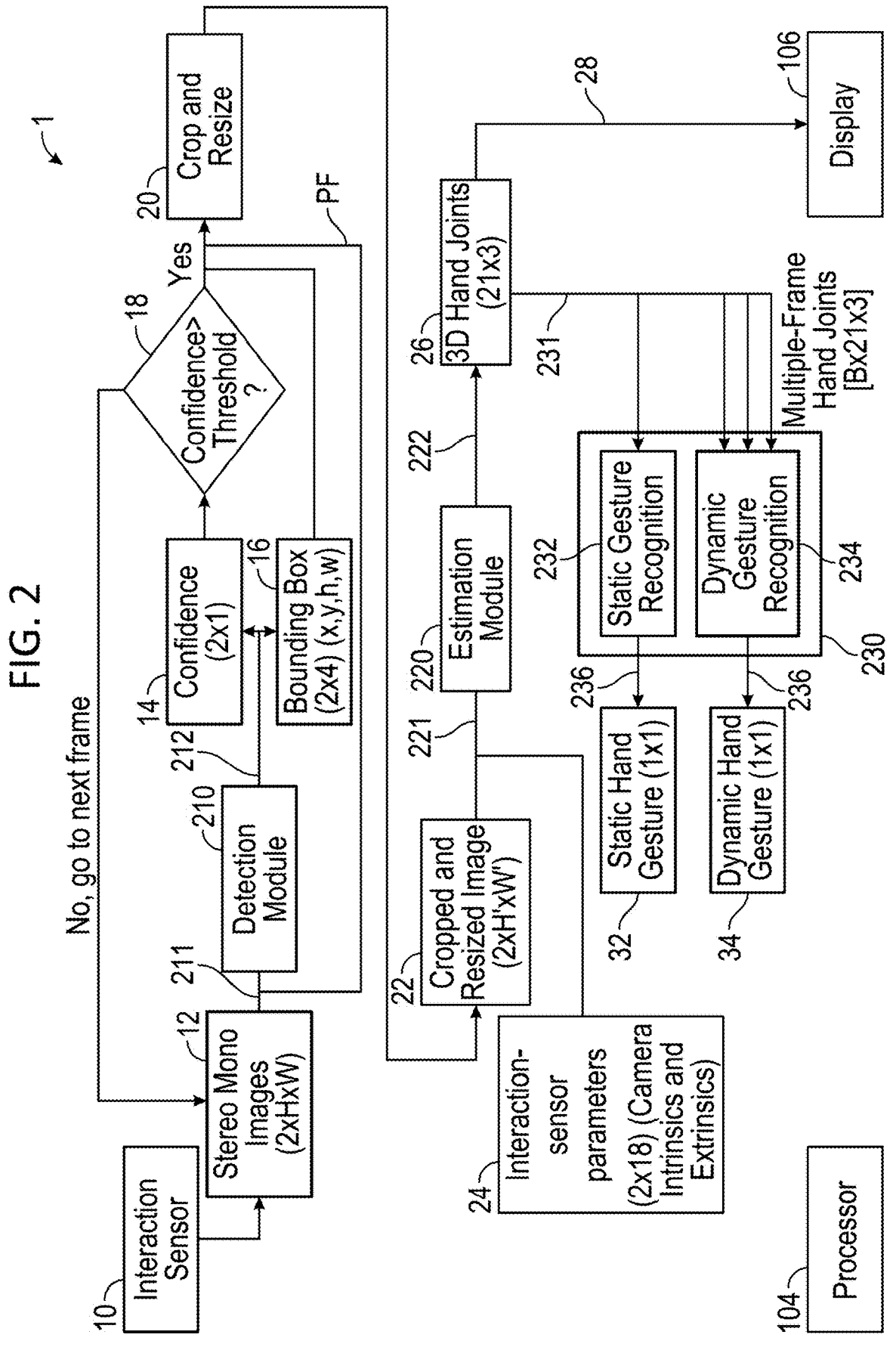
FIG. 2 is a block diagram depicting inputs and outputs associated with the system for multi-modal interaction analysis, according to some embodiments of the present disclosure.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

In the following section, the aspects of the subject matter disclosed herein will be described with reference to exemplary embodiments illustrated in the figures.

As discussed above, accurate real-time interaction analysis remains a fundamental challenge. As discussed in further detail below, aspects of some embodiments of the present disclosure provide for holistic, real-time, and accurate interaction-analysis systems to enable an immersive and comprehensive user experience.

In some embodiments, the system may provide multimodal integration. Multi-modal integration may integrate data from multiple sensors, including stereo cameras and/or depth sensors. Multi-modal integration may enhance (e.g., may improve) the system's accuracy and robustness in various environmental conditions.

In some embodiments, a system may provide improved 3D pose estimation, providing a more accurate representation of hand-joint positions and hand-joint orientations in real time.

In some embodiments, a system may enable customizable gesture recognition. For example, users may define and train custom hand gestures, making the system highly adaptable to specific applications, such as sign-language recognition or custom-gesture commands.

In some embodiments, the system may capture stereo images (e.g., synchronized stereo images) using a stereo camera setup. The stereo images may provide depth information for accurate hand analysis. For example, an estimation module may generate accurate depth information based on the stereo images.

In some embodiments, the stereo images may be passed through a detection module (e.g., through a deep-learning-based detection module). The detection module may identify and localize objects (e.g., hands) within the images. In some embodiments, the detection module may generate (e.g., may predict) a confidence (e.g., a confidence parameter or a confidence level) of detection. When an object associated with interactions (e.g., a hand) is not detected from (e.g., in) the images (e.g., when a confidence level is less than a threshold), the detection module may wait for input (e.g., stereo images) of the next frame. When an object associated with interactions is detected from the images, bounding boxes corresponding to the object associated with interactions (e.g., corresponding to the hand) may be passed to crop and resize operations to obtain cropped and resized images. For example, the detection module may perform crop and/or resize operations on images with bounding boxes applied thereto.

In some embodiments, cropped and/or resized hand images may be provided to an estimation module (e.g., a hand-pose estimation module). With the cropped images and camera parameters, the estimation module may estimate 3D positions of hand joints corresponding to the cropped and/or resized hand images to generate estimated hand-joint positions. The estimation module may provide a detailed representation of the hand pose from the hand images, based on the cropped and/or resized hand images.

In some embodiments, the estimated hand joint positions, which are output from the estimation module, may be input (e.g., may subsequently be input) to a gesture-recognition module (e.g., a hand-gesture recognition module). The gesture-recognition module may analyze spatial aspects and temporal aspects of hand movements to recognize and interpret static and dynamic hand gestures.

In some embodiments, results from each stage (including the detected hands, estimated hand poses, and recognized hand gestures) may be used to generate a visualization to provide real-time (e.g., near real-time) feedback. In some embodiments, the visualization may be in the form of on-screen overlays or 3D representations of hand poses.

In some embodiments, the structure of the system may be modular and sequential. For example, each module (e.g., each component) may build upon the output of the previous module in a cascading manner. This cascading approach may allow for efficient and accurate hand analysis, providing a flexible and effective tool for a variety of human-computer interaction applications.

In some embodiments, a single-stage model may be used instead of a cascading approach. For example, a single-stage model may simultaneously perform hand detection, pose estimation, and gesture recognition. A single-stage model may be designed to handle end-to-end hand analysis, may be implemented with a simplified architecture compared to a cascading approach, and may improve efficiency. In some embodiments, a single-stage model may be implemented by replacing image processing modules (e.g., the detection module, the estimation module, and the gesture module) with convolutional layers.

Aspects of some embodiments of the present disclosure provide for improved interaction analysis by leveraging synchronized stereo imaging to provide precise 3D pose perception (e.g., hand-pose perception) and enhance accuracy in detection (e.g., hand detection), pose estimation, and gesture recognition.

Aspects of some embodiments of the present disclosure provide for systems that balance real-time performance with accuracy, making such systems suitable for interactive applications where feedback with reduced delay (e.g., immediate feedback) is a priority.

Aspects of some embodiments of the present disclosure provide a balance between accuracy and speed to deliver real-time results with accuracy (e.g., high accuracy).

Aspects of some embodiments of the present disclosure provide for holistic, real-time, and accurate interaction analysis systems to enable an immersive and comprehensive user experience.

Figure 1:
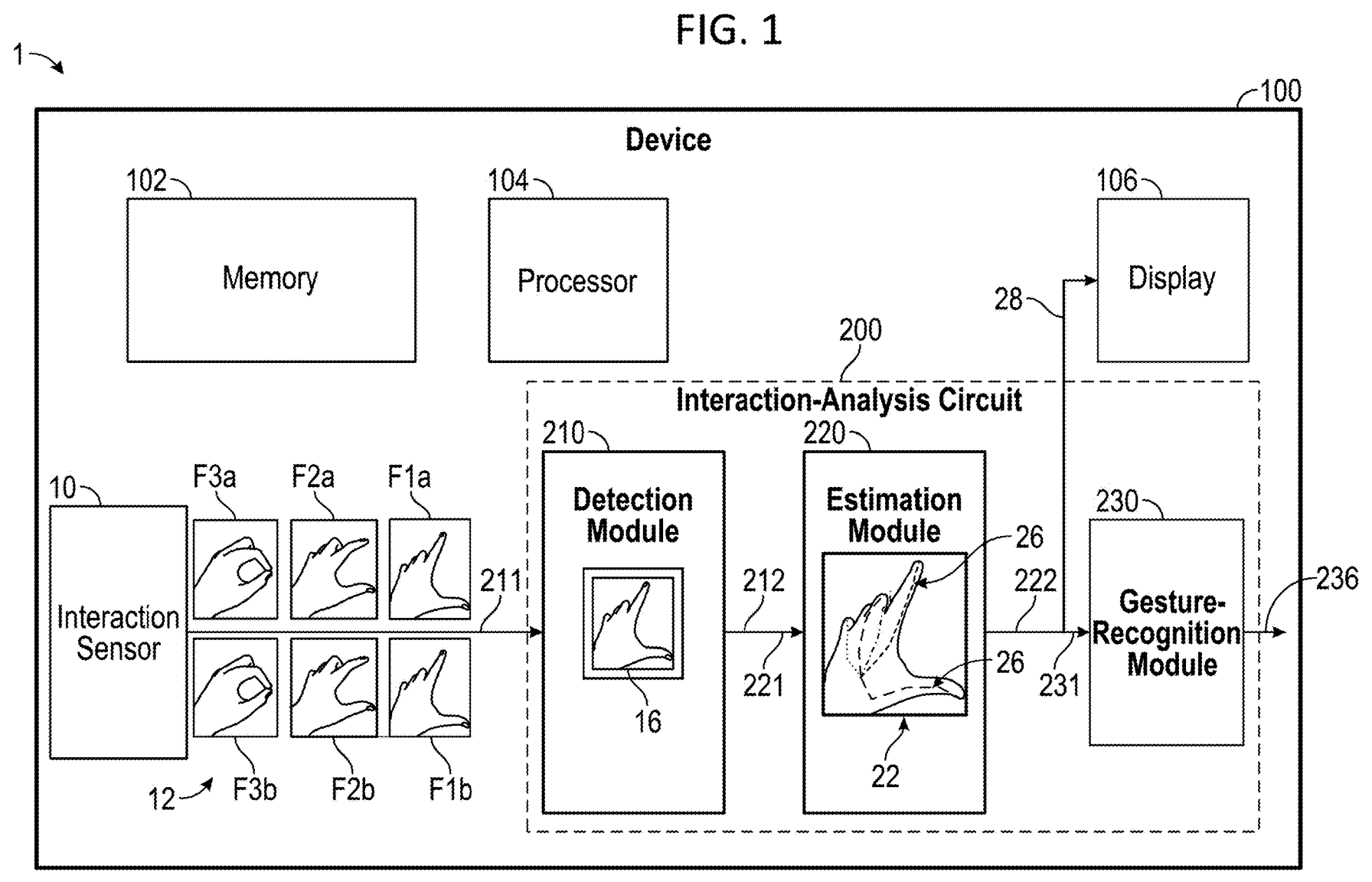

FIG. 1 is a block diagram depicting a system for multimodal interaction analysis, according to some embodiments of the present disclosure.

Referring to FIG. 1, a system 1 for analyzing interactions with a device 100 may involve performing an analysis of an object-device interaction (e.g., performing a 3D hand analysis) based on analyzing input image data 12. The system 1 may include an interaction sensor 10 for capturing input image data 12 associated with an interaction with the device 100. In some embodiments, the interaction sensor 10 may include a stereo camera. In some embodiments, the interaction sensor 10 may include a depth-sensing camera instead of, or in addition to, a stereo camera. In some embodiments, the interaction sensor 10 may include a LiDAR sensor instead of, or in addition to, the stereo camera. Although the present disclosure describes hand-pose analysis, it should be understood that the present disclosure is not limited thereto and that the present disclosure may be applied to estimating a variety of interactions with the device 100. For example, the present disclosure may be applied to estimating any part of, or an entirety of, any object that may interact with the device 100.

The system 1 may include a processor 104 (e.g., a processing circuit) communicatively coupled to a memory 102. The processor 104 may include a central processing unit (CPU), a graphics processing unit (GPU), and/or a neural processing unit (NPU). The memory 102 may store weights and other data for processing the input image data 12 by an interaction-analysis circuit 200. The system 1 may include a display 106 for displaying an image on the device 100. For example, the display 106 may correspond to display screen of a VR device or an AR device. The device 100 may correspond to an electronic device 301 of FIG. 3. The processor 104 may correspond to a processor 320 of FIG. 3. The memory 102 may correspond to a memory 330 of FIG. 3. The display 106 may correspond to a display device 360 of FIG. 3.

In some embodiments, the interaction-analysis circuit 200 may process input image data 12 that includes input stereo images. For example, the input image data 12 may include synchronized stereo images, which include: a first frame associated with a first camera position F1a (e.g., a first left frame), a first frame associated with a second camera position F1b (e.g., a first right frame that is synchronized with the first left frame), a second frame associated with the first camera position F2a (e.g., a second left frame), a second frame associated with the second camera position F2b (e.g., a second right frame that is synchronized with the second left frame), a third frame associated with the first camera position F3a (e.g., a third left frame), and a third frame associated with the second camera position F3b (e.g., a third right frame that is synchronized with the third left frame).

The input image data 12 may be provided to a detection module 210 of the interaction-analysis circuit 200 via a detection-module input 211. The detection module 210 may include a machine-learning (ML) model trained to detect objects that are capable of interacting with the device 100. For example, the ML model of the detection module 210 may be trained to detect hands and may apply a bounding box 16 (e.g., a hand-bounding box) to the hands for further processing by the interaction-analysis circuit 200. A detection-module output 212 may be communicatively coupled to an estimation-module input 221. In some embodiments, the detection module 210 may crop and resize images provided to the detection-module input 211 (e.g., to meet input characteristics for the estimation module 220). For example, the detection module 210 may generate a cropped-and-resized image 22 based on the bounding box 16. In some embodiments, the interaction-analysis circuit 200 may also provide camera parameters (e.g., intrinsic camera parameters and extrinsic camera parameters) to the estimation module 220. The camera parameters may include interaction-sensor parameters 24 (see FIG. 2).

The estimation module 220 may include a machine-learning model trained to generate a 3D pose-estimation structure 26, which may also be referred to as a 3D pose estimation, (e.g., 3D hand joints or a set of estimated hand-joint coordinates) based on the cropped-and-resized image 22. The estimation module 220 may generate the 3D pose-estimation structure 26 based on parameters of the interaction sensor 10 (e.g., based on the intrinsic camera parameters and/or extrinsic camera parameters). For example, the estimation module 220 may include a machine-learning model trained to generate a 3D pose-estimation structure 26 based on the cropped-and-resized image 22 and based on the parameters of the interaction sensor 10.

Using cropped-and-resized images 22, as inputs to the estimation module 220, along with the parameters of the interaction sensor 10 (e.g., the intrinsic camera parameters and the extrinsic camera parameters), may enable the detection module 210, the estimation module 220, and a gesture-recognition module 230 to be combined in a single device for real-time applications (e.g., for high-quality, real-time applications). For examples, in systems using single 2D input images (e.g., systems without true depth information), the parameters (e.g., depth-related parameters) of the interaction sensor 10 may not be used as inputs for further processing. In some embodiments of the present disclosure, the depth information may be provided to the estimation model along with the cropped-and-resized images 22 to allow for high-quality, real-time 3D pose estimation.

The estimation module 220 may use the 3D pose-estimation structure 26 to generate a 3D pose-estimation image 28 (e.g., a 3D hand pose). The estimation module 220 may provide the 3D pose-estimation image 28 to the display 106, via an estimation-module output 222, for displaying a 3D pose on the device 100. The estimation module 220 may be communicatively coupled to a gesture-recognition module 230. For example, the estimation-module output 222 may be communicatively coupled to a gesture-recognition-module input 231. The estimation module 220 may send the 3D pose-estimation structure 26 and/or the 3D pose-estimation image 28 to the gesture-recognition module 230 for further processing. The gesture-recognition module 230 may output a classification (e.g., a value) for a specific gesture to a gesture-recognition-module output 236 for further processing by the device 100 or by another device.

In some embodiments, the system 1 uses stereo images as inputs to provide 3D hand joints (from the estimation module 220) for accurate hand-gesture classification (from the gesture-recognition module 230). The gesture-recognition module 230 may include a machine-learning model trained to recognize gestures based on the 3D pose-estimation structure 26 and/or the 3D pose-estimation image 28. The gesture-recognition module 230 may recognize a specific gesture (e.g., a specific hand gesture) corresponding to the 3D pose-estimation structure 26 and/or the 3D pose-estimation image 28. Any of the machine-learning models of the system 1 may be any suitable machine-learning model. For example, one or more of the machine-learning models may include a convolutional neural network (CNN)-based model and/or a transformer-based model. CNN-based models may be suitable for mobile applications (e.g., may be more suitable than transformer-based models for mobile applications).

In some embodiments, detection, pose estimation, and gesture recognition may be integrated within a single system 1 (e.g., within a single device 100 or a single unit). In some embodiments, hand joints generated by the estimation module 220 may be used as inputs to the gesture-recognition module 230 for gesture recognition, which may allow for a less complex device than a device having only gesture recognition.

FIG. 2 is a block diagram depicting inputs and outputs associated with the system for multi-modal interaction analysis, according to some embodiments of the present disclosure.

Referring to FIG. 2, the inputs and outputs of the system 1 are described in further detail. The input image data 12 may be provided to the detection-module input 211. The input image data 12 may also be provided to an output of the detection module 210 (e.g., prior to a crop-and-resize operation 20). For example, in some embodiments, the system 1 may refer to a bounding box of a previous frame PF to avoid defects (e.g., defects due to false detections). In some embodiments, wherein the interaction sensor 10 includes a stereo camera, the input image data 12 may include stereo images (e.g., two mono images). For example, one mono image may correspond to a left camera and another mono image may correspond to a right camera. Each mono image may have an input-image height H and an input-image width W. In some embodiments, wherein the interaction sensor 10 includes a LiDAR, the input image data 12 may include cloud points. In some embodiments, wherein the interaction sensor 10 includes a depth sensor, the input image data 12 may include a depth image.

The input image data 12 may include image information that appears differently from one image to a next image. For example, the interaction sensor 10 may be positioned on the device 100 and the device 100 may be positioned on a user's head with relative positioning between the interaction sensor 10 and the user's hands changing between frames, such that the dimensions of the object that is capable of interacting with the device (e.g., the user's hands) appear to be changing. As discussed above, the detection module 210 may process the input image data 12 by outputting bounding boxes 16 (e.g., bounding-box images) based on the input image data 12. The bounding boxes 16 may serve to normalize the dimensions of the object detected in the input image data 12 for further processing. For example, the bounding boxes 16 may be used to generate the cropped-and-resized images 22 for processing (e.g., for real-time processing) by the estimation module 220. The cropped-and-resized images 22 and the interaction-sensor parameters 24 associated with the interaction sensor 10 may be provided as inputs to the estimation module 220 to provide 3D image information (e.g., accurate 3D image information) for further processing by the estimation module 220. As used herein, "interaction-sensor parameters" refers to parameters associated with the interaction sensor 10, which may include, or may be used to determine depth-related information (e.g., depth-related information associated with the cropped-and-resized images 22). In some embodiments, the interaction-sensor parameters 24 may include intrinsic camera parameters and/or extrinsic camera parameters. For example, the intrinsic camera parameters may include translation parameters, focal length, pixel size, etc. The extrinsic camera parameters may include camera rotation parameters, camera position, and camera orientation.

The bounding boxes for each mono image may include four parameters: an x coordinate, a y coordinate, a height h, and a width w. For example, a bounding-box position may be represented by (x, y), and a bounding-box shape may be represented by (w, h). Accordingly, the bounding boxes may have dimensions of 2×4 representing both images of a stereo image. As used herein, "dimensions of" (e.g., dimensions of A×B) refers to dimensions of a matrix used to represent the information in some embodiments of the present disclosure. In some embodiments, the detection module 210 may also output a confidence level 14 based on the input image data 12. The confidence level may include a parameter indicating a probability-related estimate for how likely the input image data 12 is to include an object (e.g., a hand) that is capable of interacting with the system 1. For example, the confidence level may be a number from 0.0 to 1.0, where a value greater than 0.5 indicates that an image is more likely than not to include a hand. The confidence-level information for the stereo images may have dimensions of 2×1. The system 1 (e.g., the detection module 210 or the processor 104) may provide the confidence level 14 to a confidence-thresholddetermination operation 18. The confidence-threshold-determination operation 18 may perform a comparison between the confidence level 14 and a threshold (e.g., 0.5). If the confidence level 14 is less than (or equal to) the threshold, the system 1 may go to the next frame in the input image data 12 (e.g., may remove a frame associated with a low confidence level 14 from further processing). In some embodiments, the system 1 may refer to the previous frame PF when the confidence level is below the threshold. If the confidence level 14 is greater than (or equal to) the threshold, the system 1 may perform further processing on the current frame.

Further processing may include performing a crop-and-resize operation 20 on the data that is output from the detection module 210. The crop-and-resize operation 20 may be performed based on a computer-vision programming-function library. The system 1 (e.g., the detection module 210 or the processor 104) may crop and resize bounding-box images to meet suitable input characteristics for the estimation module 220. For example, a cropped-and-resized image 22 may include two images having a pose-estimation (e.g., a hand-pose estimation) height H' and a pose estimation width W'. Accordingly, the cropped-and-resized image 22 may have dimensions of 2×H'×W'. The cropped-and-resized image 22 may be provided to the estimation module 220 along with the interaction-sensor parameters 24 (e.g., camera intrinsic parameters and/or camera extrinsic parameters).

The interaction-sensor parameters 24 may be obtained by the processor 104 checking camera configurations when the input image data 12 (e.g., images or videos) is captured by the interaction sensor 10. The camera parameters may have dimensions of 3×3 for the intrinsic parameters and dimensions of 3×3 for the extrinsic parameters, resulting in dimensions of 2×18 for the two images of a stereo image. The estimation module 220 may perform further processing based on the cropped-and-resized image 22 and based on the interaction-sensor parameters 24.

For example, as discussed above, the cropped-and-resized images 22 and the interaction-sensor parameters 24 may provide 3D image information (e.g., accurate 3D image information) for further processing by the estimation module 220. Different camera parameters may result in different cropped and resized images. Providing a combination of cropped-and-resized images 22 and interaction-sensor parameters 24 enables accurate 3D estimation (e.g., 3D hand-pose estimation) by the estimation module 220. For example, the combination of one data set that includes the cropped-and-resized images 22 and a second data set that includes the interaction-sensor parameters 24 may allow the estimation module 220 to use relationships between the two data sets to generate accurate 3D estimations (e.g., to generate accurate 3D pose-estimation structures 26).

In some embodiments, the estimation module 220 may include a neural network. The interaction-sensor parameters 24 may serve as additional inputs to the neural network of the estimation module 220. For example, the interaction-sensor parameters 24 may be inputs that are provided to the estimation module 220 in addition to the cropped-and-resized images 22. The estimation module 220 may have additional neural layers and additional weights corresponding to the interaction-sensor parameters 24. For example, the interaction-sensor parameters 24 may not modify (e.g., may be separate from) input feature maps or weights corresponding to the cropped-and-resized images 22.

The estimation module 220 may output (e.g., may generate) a 3D pose-estimation structure 26 (e.g., 3D hand joints) and/or a 3D pose-estimation image 28. In some embodiments, the 3D hand joints may have dimensions of 21×3. In some embodiments, the 3D pose-estimation image 28 may be provided to the display 106. For example, the display 106 may correspond to a screen of a VR device or an AR device, and a user of the device may see a 3D hand in the screen of the device, based on the 3D pose-estimation image 28 being displayed in (e.g., on) the display 106.

The output of the estimation module 220 may be provided to an input of a gesture-recognition module 230. In some embodiments, the gesture-recognition module 230 may include a static gesture-recognition module 232 and/or a dynamic gesture-recognition module 234. The static gesture-recognition module 232 may estimate specific static gestures based on static images and may output a static gesture classification 32 (e.g., a static hand-gesture classification). The dynamic gesture-recognition module 234 may estimate dynamic gestures, based on multiple frames of 3D pose-estimation structures 26 (e.g., multiple frames of hand joints) and may output a dynamic gesture classification 34. In some embodiments, the static gesture classification 32 may include an integer value with dimensions of 1×1. In some embodiments, the dynamic gesture classification 34 may include an integer value with dimensions of 1×1. The input to the dynamic gesture-recognition module 234 may have dimensions of B×21×3, wherein B is a positive integer representing a number of frames.

FIG. 3 is a block diagram of an electronic device in a network environment 300, according to an embodiment.

Referring to FIG. 3, the electronic device 301 in a network environment 300 may communicate with an electronic device 302 via a first network 398 (e.g., a short-range wireless communication network), or an electronic device 304 or a server 308 via a second network 399 (e.g., a long-range wireless communication network). The electronic device 301 may communicate with the electronic device 304 via the server 308. The electronic device 301 may include the processor 320, the memory 330, an input device 350, a sound output device 355, the display device 360, an audio module 370, a sensor module 376, an interface 377, a haptic module 379, a camera module 380, a power management module 388, a battery 389, a communication module 390, a subscriber identification module (SIM) card 396, or an antenna module 397. In one embodiment, at least one (e.g., the display device 360 or the camera module 380) of the components may be omitted from the electronic device 301, or one or more other components may be added to the electronic device 301. Some of the components may be implemented as a single integrated circuit (IC). For example, the sensor module 376 (e.g., a fingerprint sensor, an iris sensor, or an illuminance sensor) may be embedded in the display device 360 (e.g., a display).

The processor 320 may execute software (e.g., a program 340) to control at least one other component (e.g., a hardware or a software component) of the electronic device 301 coupled with the processor 320 and may perform various data processing or computations.

As at least part of the data processing or computations, the processor 320 may load a command or data received from another component (e.g., the sensor module 376 or the communication module 390) in volatile memory 332, process the command or the data stored in the volatile memory 332, and store resulting data in non-volatile memory 334. The processor 320 may include a main processor 321 (e.g., a CPU or an application processor (AP)), and an auxiliary processor 323 (e.g., a GPU, an image signal processor (ISP), a sensor hub processor, or a communication processor (CP))

that is operable independently from, or in conjunction with, the main processor 321. Additionally or alternatively, the auxiliary processor 323 may be adapted to consume less power than the main processor 321, or execute a particular function. The auxiliary processor 323 may be implemented as being separate from, or a part of, the main processor 321.

The auxiliary processor 323 may control at least some of the functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). The auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by another component (e.g., the processor 320) of the electronic device 301, from the outside (e.g., a user) of the electronic device 301. The input device 350 may include, for example, a microphone, a mouse, or a keyboard.

The sound output device 355 may output sound signals to the outside of the electronic device 301. The sound output device 355 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. The display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. The audio module 370 may obtain the sound via the input device 350 or output the sound via the sound output device 355 or a headphone of an external electronic device 302 directly (e.g., wired) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. The sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device 302 directly (e.g., wired) or wirelessly. The interface 377 may include, for example, a high-definition multimedia interface (HDMI), a universal serial bus (USB) interface, a secure digital (SD) card interface, or an audio interface.

A connecting terminal 378 may include a connector via which the electronic device 301 may be physically connected with the external electronic device 302. The connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or an electrical stimulus which may be recognized by a user via tactile sensation or kinesthetic sensation. The haptic module 379 may include, for example, a motor, a piezo-electric element, or an electrical stimulator.

The camera module 380 may capture a still image or moving images. The camera module 380 may include one or more lenses, image sensors, image signal processors, or flashes. The power management module 388 may manage power supplied to the electronic device 301. The power management module 388 may be implemented as at least part of, for example, a power management integrated circuit (PMIC).

The battery 389 may supply power to at least one component of the electronic device 301. The battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the AP) and supports a direct (e.g., wired) communication or a wireless communication. The communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or a standard of the Infrared Data Association (IrDA)) or the second network 399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. The antenna module 397 may include one or more antennas, and, therefrom, at least one antenna appropriate for a communication scheme used in the communication network, such as the first network 398 or the second network 399, may be selected, for example, by the communication module 390 (e.g., the wireless communication module 392). The signal or the power may then be transmitted or received between the communication module 390 and the external electronic device via the selected at least one antenna.

Commands or data may be transmitted or received between the electronic device 301 and the external electronic device 304 via the server 308 coupled with the second network 399. Each of the electronic devices 302 and 304 may be a device of a same type as, or a different type from, the electronic device 301. All or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

Figure 4:
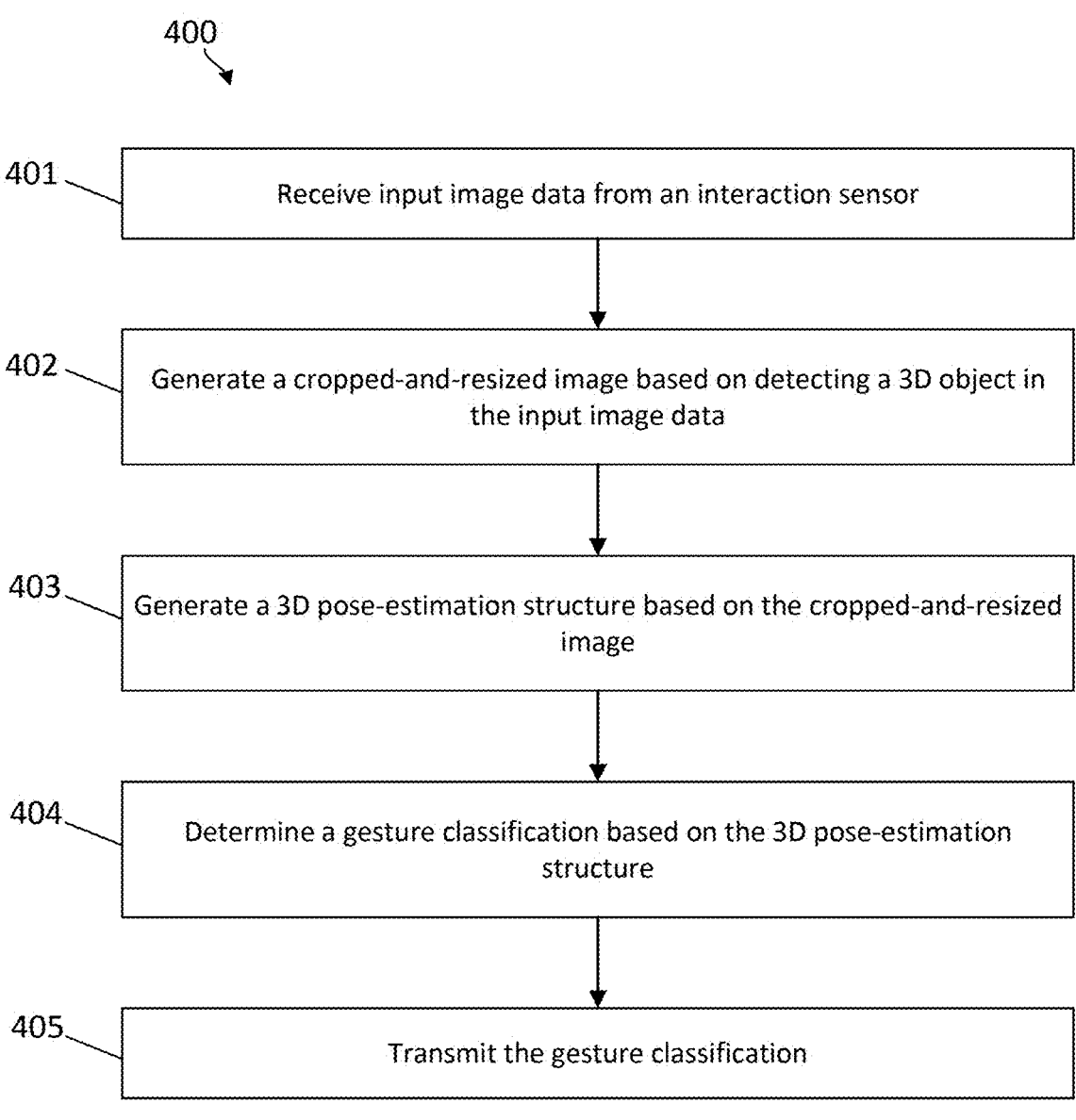
FIG. 4 is a flowchart depicting operations of a method for multi-modal interaction analysis, according to some embodiments of the present disclosure.

FIG. 4 is a flowchart depicting operations of a method for multi-modal interaction analysis, according to some embodiments of the present disclosure.

Referring to FIG. 4, an interaction-analysis circuit 200 (see FIG. 1) of a device 100 may receive input image data 12 from an interaction sensor 10 (operation 401). For example, the input image data 12 may be provided to the input of a detection module 210 of the device 100. The interaction-analysis circuit 200 may generate a cropped-and-resized image 22 based on detecting a 3D object (e.g., a hand) in the input image data 12 (operation 402). For example, the detection module 210 and/or a processor 104 of the device 100 may crop and resize image data from a detection-module output 212 using a computer-vision-programming-function library to generate the cropped-and-resized image 22. The interaction-analysis circuit 200 may generate a 3D pose-estimation structure 26 and/or a 3D pose-estimation image 28 (e.g., a 3D hand pose) based on the cropped-and-resized image 22 (operation 403). For example, an estimation module 220 of the device 100 may generate a 3D pose-estimation structure 26 (e.g., 3D hand joints) based on the cropped-and-resized image 22. The interaction-analysis circuit 200 may determine a gesture classification based on the 3D pose-estimation structure 26 and/or the 3D pose-estimation image 28 (operation 404). For example, a gesture-recognition module 230 of the device 100 may determine the gesture classification based on the 3D pose-estimation structure 26. The interaction-analysis circuit 200 or the device 100 may transmit the gesture classification (operation 405). For example, a gesture-recognition-module output 236 may transmit the gesture classification to another component of the device 100 or to a different device for further processing. In some embodiments, further processing may include configuring a setting (e.g., changing a setting) of the device 100 or of the different device based on the gesture classification.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method for interaction analysis, the method comprising:

receiving, by an interaction-analysis circuit of a device, input image data from an interaction sensor;

generating, by the interaction-analysis circuit, a cropped-and-resized image based on detecting a three-dimensional (3D) object in the input image data;

generating, by the interaction-analysis circuit, a 3D pose-estimation structure based on receiving, as inputs to the interaction-analysis circuit:

the cropped-and-resized image; and one or more interaction-sensor parameters associated with determining depth information, the one or more interaction-sensor parameters comprising at least one of a translation parameter, a focal length, a pixel size, a rotation parameter, a camera position, or a camera orientation;

determining, by the interaction-analysis circuit, a gesture classification based on the 3D pose-estimation structure; and transmitting the gesture classification.

2. The method of claim 1, wherein the one or more interaction-sensor parameters are associated with determining depth information associated with the cropped-and-resized image.

3. The method of claim 1, wherein:

the interaction sensor comprises a stereo camera; and the input image data comprises a first image associated with a left sensor and a second image associated with a right sensor.

4. The method of claim 1, wherein:

the interaction sensor comprises a depth sensing camera; and the input image data comprises depth image data.

5. The method of claim 1, wherein:

the interaction sensor comprises a light detection and ranging (LiDAR) sensor; and the input image data comprises cloud point data.

6. The method of claim 1, further comprising generating, by a first machine-learning model, a bounding-box image and a confidence level, based on the input image data, wherein the detecting the 3D object is performed by the first machine-learning model.

7. The method of claim 6, wherein the first machine-learning model comprises a convolutional neural network (CNN).

8. The method of claim 6, further comprising:

cropping and resizing the bounding-box image to generate the cropped-and-resized image; and inputting the cropped-and-resized image to a second machine-learning model, wherein the generating the 3D pose-estimation structure is performed, by the second machine-learning model, based on the cropped-and-resized image.

9. The method of claim 8, further comprising outputting, by a third machine-learning model, a classification of a gesture, wherein the determining the gesture is performed by the third machine-learning model and based on a plurality of outputs from the second machine-learning model.

10. A device for interaction analysis, the device comprising:

a memory; and a processor communicatively coupled to the memory, wherein the processor is configured to:

receive input image data from an interaction sensor;

generate a cropped-and-resized image based on detecting a three-dimensional (3D) object in the input image data;

generate a 3D pose-estimation structure based on receiving, as inputs:

the cropped-and-resized image; and one or more interaction-sensor parameters associated with determining depth information, the one or more interaction-sensor parameters comprising at least one of a translation parameter, a focal length, a pixel size, a rotation parameter, a camera position, or a camera orientation;

determine a gesture classification based on the 3D pose-estimation structure; and transmit the gesture classification.

11. The device of claim 10, wherein the one or more interaction-sensor parameters are associated with the cropped-and-resized image.

12. The device of claim 10, wherein the processor is configured to:

detect the 3D object based on a first machine-learning model; and generate a bounding-box image and a confidence level, based on providing the input image data to the first machine-learning model.

13. The device of claim 10, wherein the processor is configured to:

crop and resize a bounding-box image to generate the cropped-and-resized image; and generate the 3D pose-estimation structure based on providing the cropped-and-resized image to a second machine-learning model.

14. The device of claim 13, wherein the processor is configured to:

determine the gesture classification based on providing the 3D pose-estimation structure to a third machine-learning model; and output the gesture classification from the third machine-learning model.

15. The device of claim 14, wherein the processor is configured to determine the gesture classification based on a plurality of outputs from the second machine-learning model.

16. A system for interaction analysis, the system comprising:

a memory; and a means for processing configured to:

receive input image data from an interaction sensor;

generate a cropped-and-resized image based on detecting a three-dimensional (3D) object in the input image data;

generate a 3D pose-estimation structure based on receiving, as inputs:

the cropped-and-resized image; and one or more interaction-sensor parameters associated with determining depth information, the one or more interaction-sensor parameters comprising at least one of a translation parameter, a focal length, a pixel size, a rotation parameter, a camera position, or a camera orientation;

determine a gesture classification based on the 3D pose-estimation structure; and transmit the gesture classification.

17. The system of claim 16, wherein the one or more interaction-sensor parameters are associated with determining depth information associated with the cropped-and-resized image.

18. The system of claim 16, wherein the means for processing is configured to:

detect the 3D object based on a first machine-learning model; and generate a bounding-box image and a confidence level, based on providing the input image data to the first machine-learning model.

19. The system of claim 17, wherein the means for processing is configured to:

crop and resize a bounding-box image to generate the cropped-and-resized image; and generate the 3D pose-estimation structure based on providing the cropped-and-resized image to a second machine-learning model.

20. The system of claim 18, wherein the means for processing is configured to:

determine the gesture classification based on providing the 3D pose-estimation structure to a third machine-learning model; and output the gesture classification from the third machine-learning model.

* * * * *